United States Patent
Jin

(10) Patent No.: US 8,264,435 B2
(45) Date of Patent: Sep. 11, 2012

(54) LIQUID CRYSTAL DISPLAY DEVICE AND DRIVING METHOD THEREOF

(75) Inventor: Hyun Suk Jin, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 1036 days.

(21) Appl. No.: 12/000,918

(22) Filed: Dec. 18, 2007

(65) Prior Publication Data

US 2008/0259264 A1    Oct. 23, 2008

(30) Foreign Application Priority Data

Apr. 18, 2007  (KR) .................. 10-2007-0037940

(51) Int. Cl.
G09G 3/36          (2006.01)
(52) U.S. Cl. ................. 345/87; 345/38; 345/39; 345/50
(58) Field of Classification Search ................... None
See application file for complete search history.

(56) References Cited

U.S. PATENT DOCUMENTS

| | | | |
|---|---|---|---|
| 5,808,705 A | 9/1998 | Hishida et al. | |
| 6,710,832 B2 * | 3/2004 | Hattori et al. ................. | 349/124 |
| 2005/0094077 A1 * | 5/2005 | Baek ............................. | 349/141 |
| 2006/0279502 A1 * | 12/2006 | Chang ............................ | 345/95 |
| 2007/0040780 A1 * | 2/2007 | Gass et al. ...................... | 345/87 |
| 2007/0040975 A1 | 2/2007 | Momoi | |

FOREIGN PATENT DOCUMENTS

TW        200617859     6/2006

* cited by examiner

*Primary Examiner* — Sumati Lefkowitz
*Assistant Examiner* — Jesus Hernandez
(74) *Attorney, Agent, or Firm* — McKenna Long & Aldridge LLP

(57) ABSTRACT

A liquid crystal display device includes pixels having a plurality of subpixels. The pixels include data displaying subpixels having a first pixel electrode receiving red, green, and blue data voltages to display an image, and a common electrode to which a common voltage is applied. The pixels further a viewing angle controlling subpixel driven in response to a voltage applied to the common electrode, a side electrode separated from the common electrode, and a second pixel electrode. Each of the subpixels includes a rib distorting an electric field applied to the corresponding liquid crystal layer. The viewing angle controlling subpixel delays a phase of the light from the data displaying subpixels when a voltage having a voltage difference from the common voltage is applied to the side electrode during a narrow viewing angle mode of the liquid crystal display device.

11 Claims, 10 Drawing Sheets

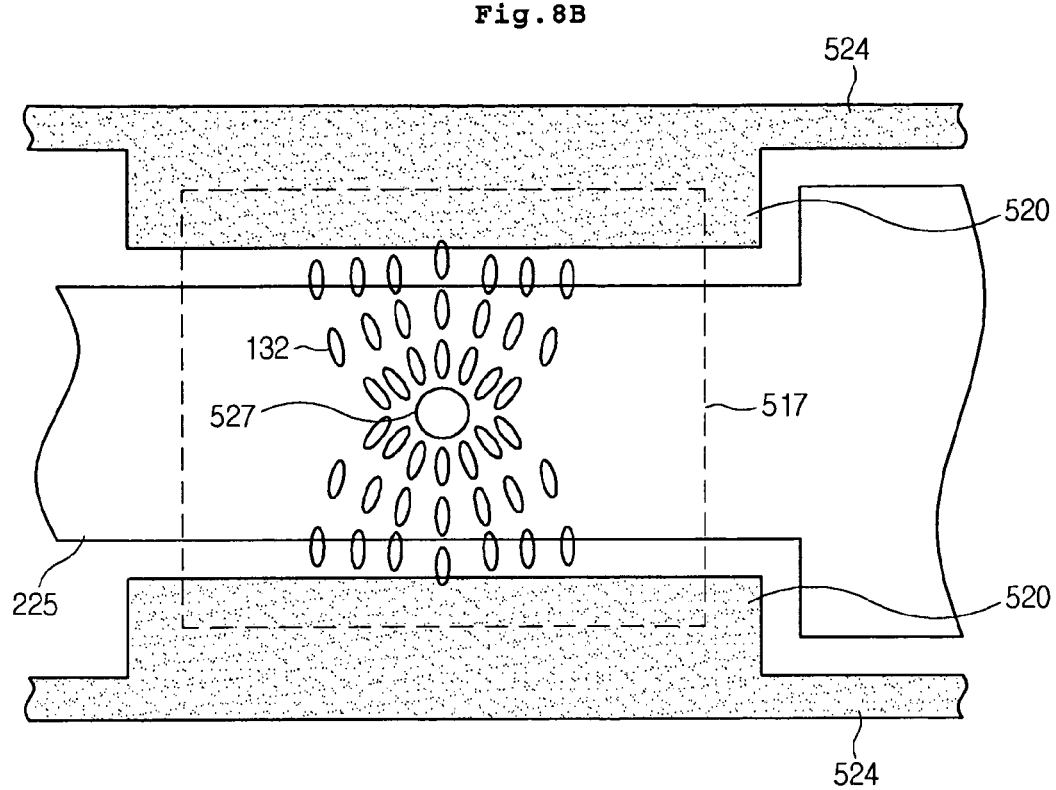

LIQUID CRYSTAL DISPLAY DEVICE AND DRIVING METHOD THEREOF

This application claims the benefit of Korean Patent Application No. 10-2007-0037940, filed on Apr. 18, 2007, which is hereby incorporated by reference for all purposes as if fully set forth herein.

BACKGROUND OF THE INVENTION

1. Field of the Invention

The present invention relates to a liquid crystal display (LCD) device and a driving method thereof, and more particularly, to an LCD device that can control a viewing angle and improve brightness of an image, and a driving method thereof.

Liquid crystals (LCs) have dielectric anisotropy and refractive index anisotropy. The arrangement of molecules of the LCs varies according to an electric field applied thereto with the polarization of light changing according to the arrangement. An LCD device applies an electric field to LCs having dielectric anisotropy and refractive index anisotropy to control light transmittance through the LCs to thereby display an image.

FIG. 1 is a view of a related art LCD device.

Referring to FIG. 1, the LCD device includes an upper substrate 11 including a color filter array 19, and a lower substrate 1 including a thin film transistor (TFT) array 9, the upper substrate 11 and the lower substrate 1 being attached to face each other, and LCs 16 filling cell gaps disposed between the two substrates 11 and 1.

The color filter array 19 includes a black matrix 12, a color filter layer 13, an overcoat layer 14 for planarizing the upper substrate 11, and a common electrode 15 for forming an electric field in cooperation with a pixel electrode 7. The color filter array 19 further includes an upper alignment layer for uniformly aligning the LCs 16.

The TFT array 9 includes gate lines 2 and data lines 3 crossing each other to define pixels on the lower substrate 1. Each pixel of the array includes a TFT 6 connected to a gate lines 2 and a data line 3, and a pixel electrode 7 connected to the TFT 6. The TFT array 9 further includes a lower alignment layer for uniformly aligning the LCs 16.

The TFT 6 supplies a data signal from the data line 3 to the pixel electrode 7 in response to a gate signal from the gate line 2. An electric field is generated between the pixel electrode 7 to which the data signal has been supplied through the TFT 6, and the common electrode 15 to which a reference voltage has been supplied. The light transmittance of the LCs 16 arranged between the lower substrate 1 and the upper substrate 11 is controlled by this electric field to display an image.

The LCD device has been developed to improve a viewing angle characteristic so that an image can be viewed from any direction. However, providing a wide viewing angle has the side effect of allowing the leakage of private information in applications in which a computer system is used for private purposes or in security-oriented businesses such as performing tasks at a bank.

Accordingly, there is a need to develop an LCD device that can selectively control a viewing angle. In other words it is desired to develop an LCD providing a wide viewing angle mode allowing an image to be viewed to a user at various viewing angles, and providing a narrow viewing angle mode limiting displaying an image to a user at a specific viewing angle.

SUMMARY OF THE INVENTION

Accordingly, the present invention is directed to liquid crystal display (LCD) device and driving method thereof that substantially obviates one or more of the problems due to limitations and disadvantages of the related art.

An advantage of the present invention is to provide Embodiments provide an LCD device that can control a viewing angle and a driving method thereof.

Another advantage of the present invention is to provide an LCD device that improves brightness of an image and a driving method thereof.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes: a pixel for displaying an image including a plurality of subpixels, the subpixels of the pixel including: data displaying subpixels each including a corresponding liquid crystal layer of a vertical alignment mode using negative liquid crystals interposed between a corresponding first pixel electrode, the data displaying subpixels for receiving red, green, and blue data voltages to display an image, and a common electrode to which a common voltage is applied; and a viewing angle controlling subpixel including a corresponding liquid crystal layer of the vertical alignment mode driven in response to voltages applied to the common electrode, a side electrode separated from the common electrode, and a second pixel electrode, each of the subpixels of the pixel further including a rib distorting an electric field applied to the corresponding liquid crystal layer, the viewing angle controlling subpixel substantially directly passing light from the data displaying subpixels when an equivalent voltage to the common voltage to the common electrode is applied to the side electrode during a wide viewing angle mode of the liquid crystal display device, and delaying a phase of the light from the data displaying subpixels when a voltage having a voltage difference from the common voltage applied to the common electrode is applied to the side electrode during a narrow viewing angle mode of the liquid crystal display device.

In another aspect of the present invention, a method for driving a liquid crystal display device includes: applying a common voltage to data displaying subpixels and applying a voltage having substantially the same potential as that of the common voltage to a side electrode of a viewing angle controlling subpixel to substantially directly pass light from the data displaying subpixels through the viewing angle controlling subpixel during a wide viewing angle mode; and applying the common voltage to the data displaying subpixels and applying a voltage having a voltage difference from the common voltage to the side electrode of the viewing angle controlling subpixel to delay, at the viewing angle controlling subpixel, phase of light from the data displaying subpixels during a narrow viewing angle mode, the data displaying subpixels comprising a liquid crystal layer of a vertical alignment mode using negative liquid crystals between a first electrode to which red, green, and blue data voltages are applied, and a common electrode to which the common voltage is applied, and the viewing angle controlling subpixel comprising the liquid crystal layer of the vertical alignment mode driven in response to a voltage applied to the common electrode, a side electrode separated from the common electrode, and a second pixel electrode.

It is to be understood that both the foregoing general description and the following detailed description are exemplary and explanatory and are intended to provide further explanation of the invention as claimed.

BRIEF DESCRIPTION OF THE DRAWINGS

FIGS. 8A and 8B are views illustrating a narrow viewing angle mode of an LCD device according to an embodiment of the invention.

DETAILED DESCRIPTION OF THE ILLUSTRATED EMBODIMENTS

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily references to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Reference will now be made in detail to embodiments of the present invention, examples of which are illustrated in the FIGS. 2 to 8 of the accompanying drawings. Wherever possible, the same reference numbers will be used throughout the drawings to refer to the same or like parts.

An LCD device according to an embodiment is formed by attaching a first substrate including a TFT array and a second substrate including a color filter array such that those arrays face each other. An LC layer is interposed between the first and second substrates.

Figure 1:
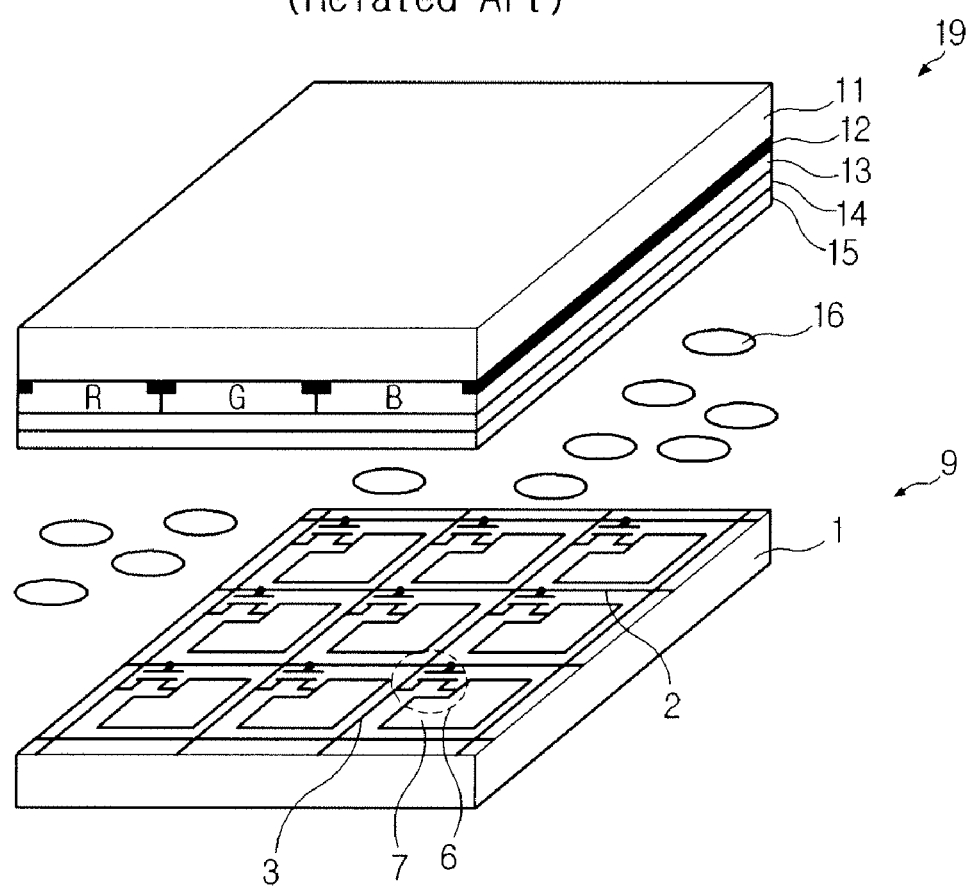
FIG. 1 is a view of a related art liquid crystal display (LCD) device.
Figure 2:
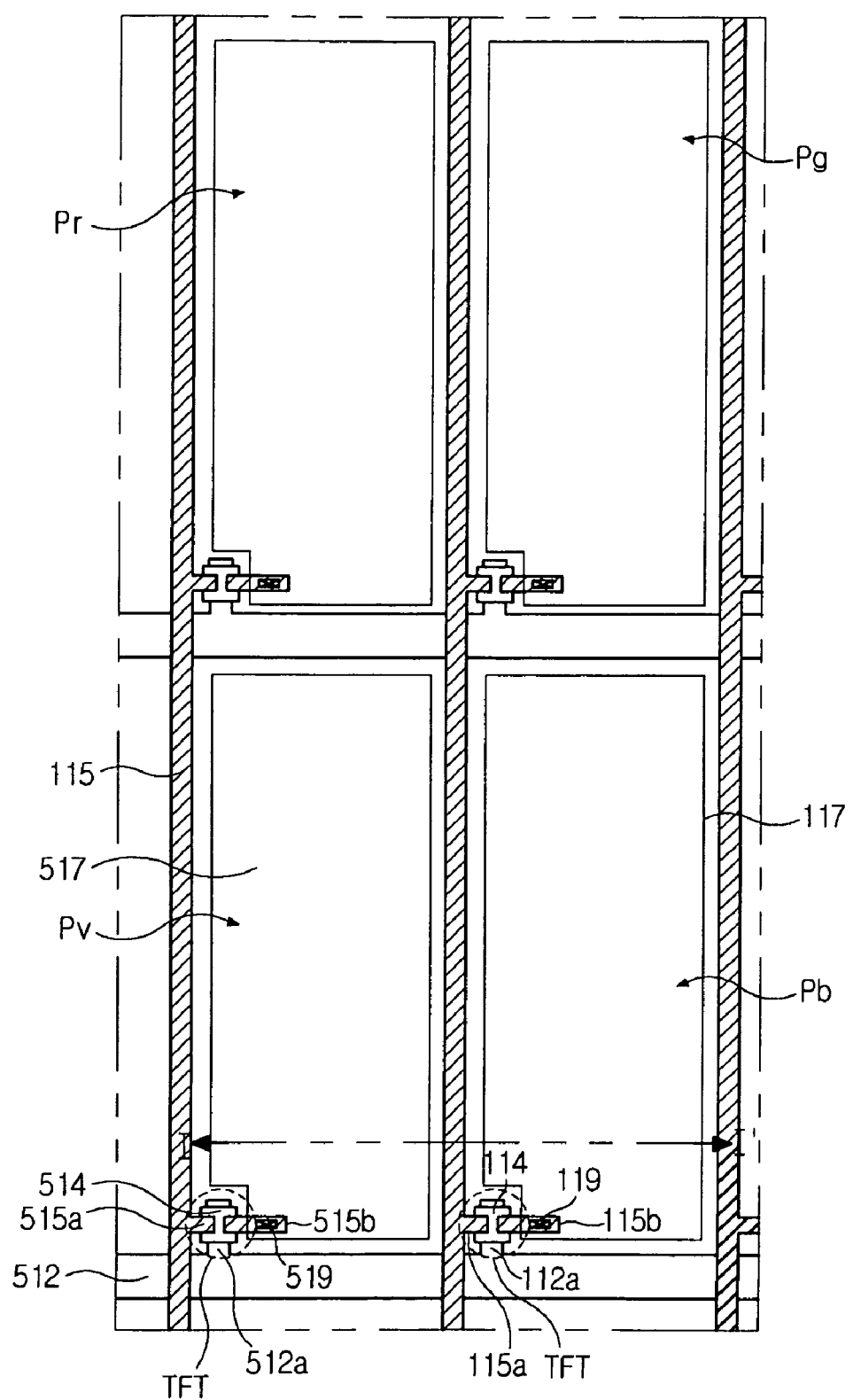
FIG. 2 is a plan view illustrating a TFT array of an LCD device according to an embodiment of the invention.
Figure 3:
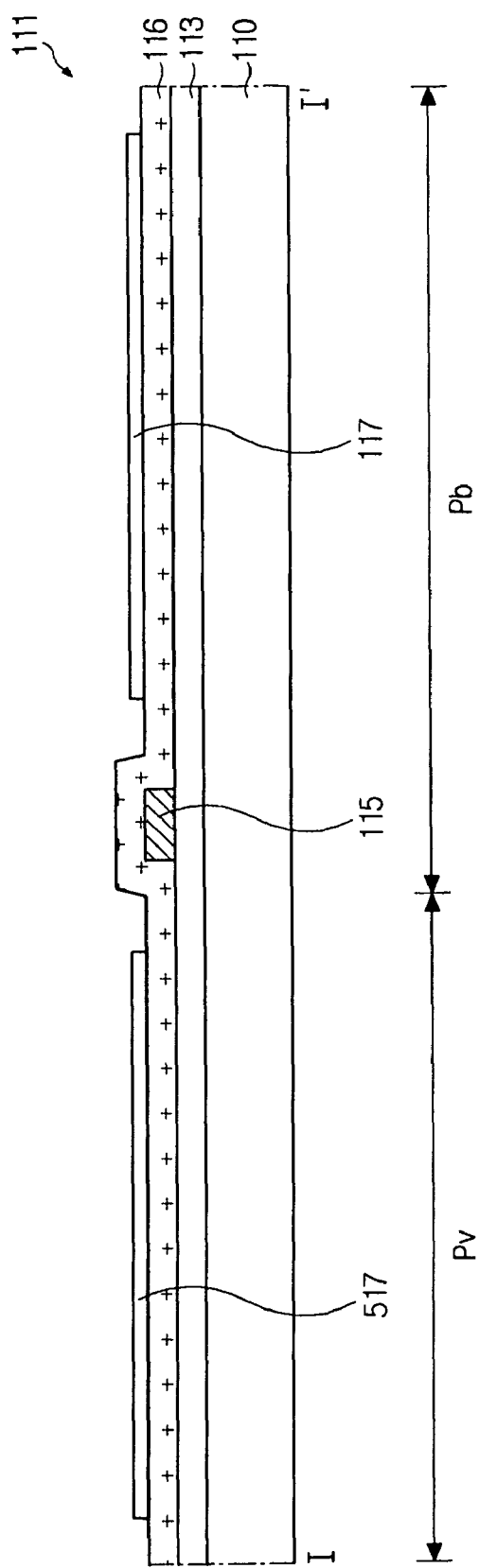
FIG. 3 is a cross-sectional view of a TFT taken along the line I-I' of FIG. 2.

FIG. 2 is a plan view illustrating a TFT array according to an embodiment of the invention, and FIG. 3 is a cross-sectional view taken along the line I-I' of FIG. 2. The line I-I' is a line representing a horizontal direction of a display surface.

Referring to FIGS. 2 and 3, the TFT array according to an embodiment includes a plurality of pixels formed on the first substrate. The pixels include subpixels Pr, Pg, Pb, and Pv defined by crossing of a plurality of gate lines 112 with a plurality of data lines 115. One pixel includes data displaying subpixels Pr, Pg, and Pb for realizing red (R), green (G), and blue (B) pixels, respectively, and a viewing angle controlling subpixel Pv for controlling a viewing angle.

The data displaying subpixels Pr, Pg, and Pb each includes a TFT near a crossing of the gate line 112 and the data line 115 and connected to the gate line 112 and the data line, and a first pixel electrode 117 connected to the TFT.

The viewing angle controlling subpixel Pv includes a TFT near a crossing of the gate line 112 and the data line 115 and connected to the gate line 112 and the data line, and a second pixel electrode 517 connected to the TFT.

The gate line 112 and the data line 115 cross each other with a gate insulating layer 113 interposed to insulate the gate line 112 and the data line 115 from each other. The gate line 112 supplies a scan voltage to the TFT, and the data line 115 supplies a data voltage to the TFT.

The TFTs of the data displaying subpixels Pr, Pg, and Pb allow R, G, and B data voltages of the data line 115 to charge the first pixel electrode 117 in response to a scan voltage of the gate line 112. For this purpose, the TFTs of the data displaying subpixels Pr, Pg, and Pb include a gate electrode 112a branching from the gate line 112, a source electrode 115a branching from the data line 115, and a drain electrode 115b connected to the first pixel electrode 117. A semiconductor pattern 114 makes ohmic-contacts with the source electrode 115a and the drain electrode 115b. The data line 115 and the semiconductor pattern 114 are protected by a passivation layer 116 covering the data line 115 and the semiconductor pattern 114.

The first pixel electrode 117 is connected to the drain electrode 115b through a first contact hole 119 passing through the gate insulating layer 113 and exposing the drain electrode 115b.

R, G, and B data voltages passing through the TFTs of the data displaying subpixels Pr, Pg, and Pb are supplied to the first pixel electrode 117. Accordingly, a potential difference is generated between the first pixel electrode 117 and a common electrode of the color filter array. This potential difference drives LCs contained in the data displaying subpixels Pr, Pg, and Pb to realize a pixel of an image.

The TFT of the viewing angle controlling subpixel Pv allows a viewing angle controlling data voltage of the data line 115 to charge the second pixel electrode 517 in response to a scan voltage of the gate line 112. For this purpose, the TFT of the viewing angle controlling subpixel Pv includes a gate electrode 512a branching from the gate line 112, a source electrode 515a branching from the data line 115, and a drain electrode 515b connected to the second pixel electrode 517. A semiconductor pattern 514 makes ohmic-contacts with the source electrode 515a and the drain electrode 515b. The data line 115 and the semiconductor pattern 514 are protected by a passivation layer 116 covering the data line 115 and the semiconductor pattern 514.

The second pixel electrode 517 is connected to the drain electrode 515b through a second contact hole 519 passing through the gate insulating layer 113 and exposing the drain electrode 515b.

A viewing angle controlling data voltage passing through the TFT of the viewing angle controlling subpixel Pv is supplied to the second pixel electrode 517. Accordingly, a potential difference is generated between the second pixel electrode 517 and the common electrode of the color filter array. This potential difference drives the LCs contained in the viewing angle controlling subpixel Pv to control the viewing angle and the brightness of the pixel.

The TFT array 111 according to the embodiment can be manufactured through a plurality of mask processes including a photolithography process and an etching process. An example of a TFT array manufacturing method is schematically described with reference to FIGS. 2 and 3.

During a first mask process, a gate conductive pattern including the gate line 112 and the gate electrodes 112a and 512a is formed on the first substrate 110.

The gate conductive pattern can be a single layer or a multiple layer formed by stacking one or more metal such as Mo, Ti, Cu, AlNd, Al, Cr, an Mo alloy, a Cu alloy, and an Al alloy.

The gate insulating layer 113 covering the gate conductive pattern is formed on the first substrate 110. During a second mask process, a source/drain conductive pattern including the semiconductor patterns 114 and 514, the data line 115, the source electrodes 115a and 515a, and the drain electrodes 115b and 515b is formed on the gate insulating layer 113.

The gate insulating layer 113 can be generally formed of an inorganic insulating material such as SiOx and SiNx. The semiconductor pattern can be formed in a structure where amorphous silicon and amorphous silicon doped with impurities (n+ or p+) are stacked. An amorphous silicon layer is exposed between the source electrode 115a/515a and the drain electrode 115b/515b.

The source/drain conductive pattern can be a single layer or multiple layers formed by stacking one or more metal such as Mo, Ti, Cu, AlNd, Al, Cr, an Mo alloy, a Cu alloy, and an Al alloy.

During the second mask process, the semiconductor patterns 114 and 514, and the source/drain conductive pattern can be formed through a one mask process using a half tone mask or a diffraction exposure mask. Accordingly, the semiconductor patterns 114 and 514 overlap the corresponding source/drain conductive patterns.

The passivation layer 116 covering the semiconductor patterns 114 and 514 and the source/drain conductive pattern is formed on the gate insulating layer 113. Subsequently, contact holes 119 and 519 are formed during a third mask process.

The passivation layer 116 can be formed of an inorganic insulating material such as SiOx and SiNx, or an organic insulating material such as benzo cyclobutene (BCB), perfluorocyclobutane (PFBC), Teflon, and cytop.

A transparent conductive pattern including the second pixel electrode 517 and the first pixel electrode 117 is formed on the passivation layer 116 through a fourth mask process.

The transparent conductive pattern can be formed of indium-tin-oxide (ITO), tin-oxide (TO), indium-zinc-oxide (IZO), or indium-tin-zinc-oxide (ITZO).

Figure 4:
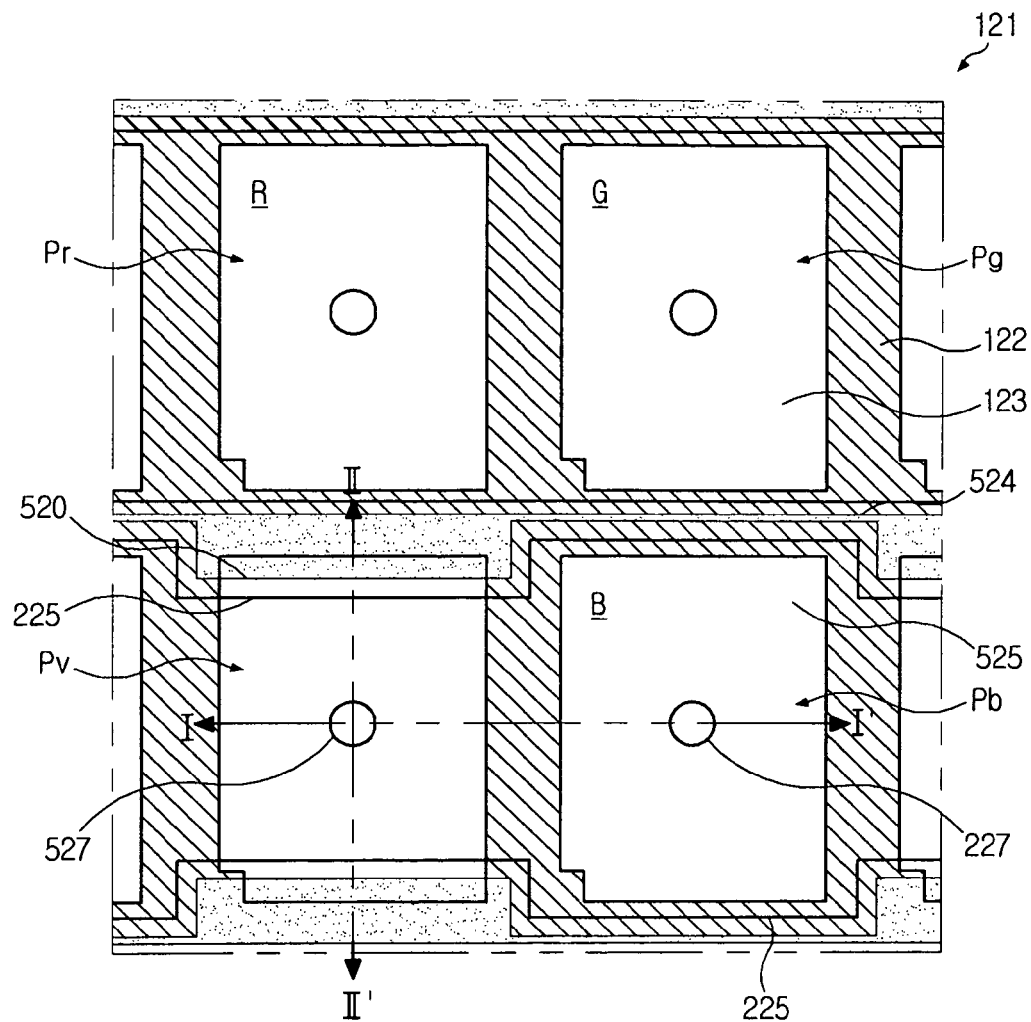
FIG. 4 is a plan view illustrating a color filter array of an LCD device according to an embodiment of the invention.
Figure 5:
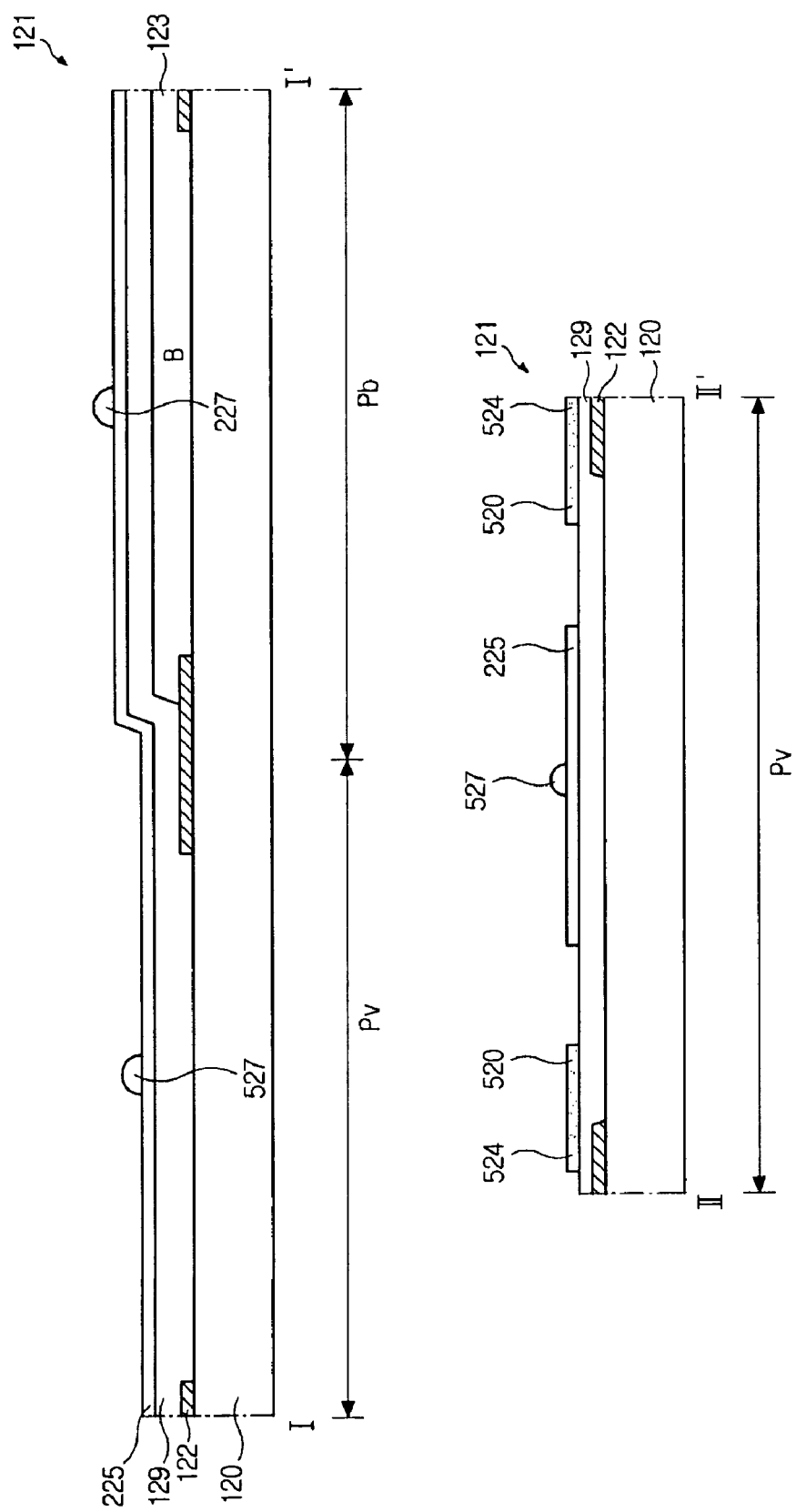
FIG. 5 is a cross-sectional view of a color filter array taken along the lines I-I' and II-II' of FIG. 4.

FIG. 4 is a view illustrating a color filter array of an LCD device according to an embodiment of the present invention, and FIG. 5 is a cross-sectional view taken along the lines I-I' and II-II' of FIG. 4. The line I-I' is a line representing the horizontal direction of a display surface, and the line II-II' is a line representing a vertical direction of the display surface.

Referring to FIGS. 4 and 5, a color filter array 121 according to an embodiment of the invention includes a plurality of pixels formed on a second substrate 120. Each pixel includes subpixels Pr, Pg, Pb, and Pv defined by a black matrix (BM) 122. Each pixel includes data displaying subpixels Pr, Pg, and Pb for realizing red (R), green (G), and blue (B) pixels, respectively, and a viewing angle controlling subpixel Pv for controlling a viewing angle.

The BM 122 divides the pixels into subpixels Pr, Pg, Pb, and Pv, and prevents light leakage at regions where gate lines, data lines, and TFTs are formed, and from the regions adjacent to the TFT array.

Common electrodes 225 are formed in the subpixels Pr, Pg, Pb, and Pv. The common electrodes 225 according to embodiments of the invention may be independently formed in pixel rows in the form of a row arrangement of the subpixels Pr, Pg, Pb, and Pv, respectively, or may be independently formed in pixel columns in the form of a column arrangement of the subpixels Pr, Pg, Pb, and Pv, respectively. The drawing in FIG. 4 illustrates the embodiment having the common electrodes 225 independently formed in pixel rows, respectively.

Ribs 227 and 527 formed of an organic insulating material having a low dielectric constant are formed at the centers of the subpixels Pr, Pg, Pb, and Pv. The ribs 227 and 527 distort an electric field formed in the subpixels Pr, Pg, Pb, and Pv to allow LCs to be symmetrically arranged with respect to the ribs 227 and 527.

Color filter patterns 123 are formed in data displaying subpixels Pr, Pg, and Pb of the subpixels Pr, Pg, Pb, and Pv. The color filter patterns 123 include a red layer formed on the R subpixel Pr, a green layer formed on the G subpixel Pg, and a blue layer formed on the B subpixel Pb, and transmit R, G, and B light, respectively.

A side electrode 520 separated from the common electrode 225 is formed in the viewing angle controlling subpixel Pv of the subpixels Pr, Pg, Pb, and Pv. The side electrode 520 distorts an electric field formed in the viewing angle controlling subpixel Pv to contribute to brightness improvement of the pixel when operating in the narrow viewing angle mode. For this purpose, the side electrode 520 includes a pair of side electrodes facing each other with the common electrode 225 interposed between the pair of side electrodes. The side electrode 520 overlaps the BM 122 and connects to a control line 524 avoiding (that is, not overlapping) the data displaying subpixels Pr, Pg, and Pb to receive a control signal.

The color filter patterns 123 and the BM 122 are covered with an overcoat layer 129. The overcoat layer 129 planarizes height differences generated by the forming of the BM 122 and the color filter patterns 123.

The color filter array 121 according to the embodiment can be manufactured through a plurality of mask processes including a photolithography process and an etching process. An example of a color filter array manufacturing method is schematically described with reference to FIGS. 4 and 5.

During a first mask process, the BM 122 is formed on the second substrate 120. The BM 122 can be formed of an opaque metal including Cr, or a black resin.

The color filter patterns 123 are subsequently formed through a second mask process. The color filter patterns 123 can be red, green, and blue color resists. The second mask process may include a process of shifting a second mask to sequentially pattern the R, G, and B color resists.

The BM 122 and the color filter pattern 123 are covered with the overcoat layer 129.

The overcoat layer 129 can be a transparent resin.

A transparent conductive pattern including the common electrode 225, the control line 524, and the side electrode 520 is formed on the overcoat layer 129 through a third mask process.

The transparent conductive pattern can be formed of indium-tin-oxide (ITO), tin-oxide (TO), indium-zinc-oxide (IZO), or indium-tin-zinc-oxide (ITZO).

Ribs 227 and 527 are formed on portions of the common electrode 225 corresponding to the centers of the subpixels Pr, Pg, Pb, and Pv. The ribs 227 and 527 are formed of an acryl-based organic compound having a low dielectric constant.

A method for manufacturing an LCD device according to an embodiment includes forming the TFT array 111 and the color filter array 121 as described in FIGS. 2 to 5. The method further includes a process of attaching the first substrate 110 and the second substrate 120 to each other such that the TFT array 111 and the color filter array 121 face each other, an LC forming process, and a polarizer attaching process.

The LCs can be dropped on the TFT array 111 or the color filter array 121 before the first and second substrates 110 and 120 are attached to each other to from a LC layer. Alternatively, after the first and second substrates 110 and 120 are attached to each other, the LCs can be injected into a space between the TFT array 111 and the color filter array 121. The LCs can be formed in various ways and practice of the invention is not limited to a particular method of forming the LC layer.

During a process of attaching the first and second substrates 110 and 120 to each other such that the TFT array 111 and the color filter array 121 face each other, the subpixels Pr, Pg, Pb, and Pv contained in the arrays 111 and 121 face each other, and the BM 122 of the color filter array 121 overlaps the TFT of the TFT array 111, the gate lines 112, and the data lines 115.

The polarizer includes a first polarizer and a second polarizer attached on the outer surfaces of the two substrates, respectively. The transmission axes of the first polarizer and the second polarizer are perpendicular to each other.

The LCD device according to an embodiment includes a vertical alignment (VA) mode LC layer. That is, the LC layer according to the embodiment is a negative type LC layer having negative dielectric anisotropy, and includes LC molecules vertically aligned at an initial alignment.

The LCD device according to the above described embodiment displays black on a screen when a signal is not applied. That is, the LCD device operates in a normally black mode.

Figure 6:
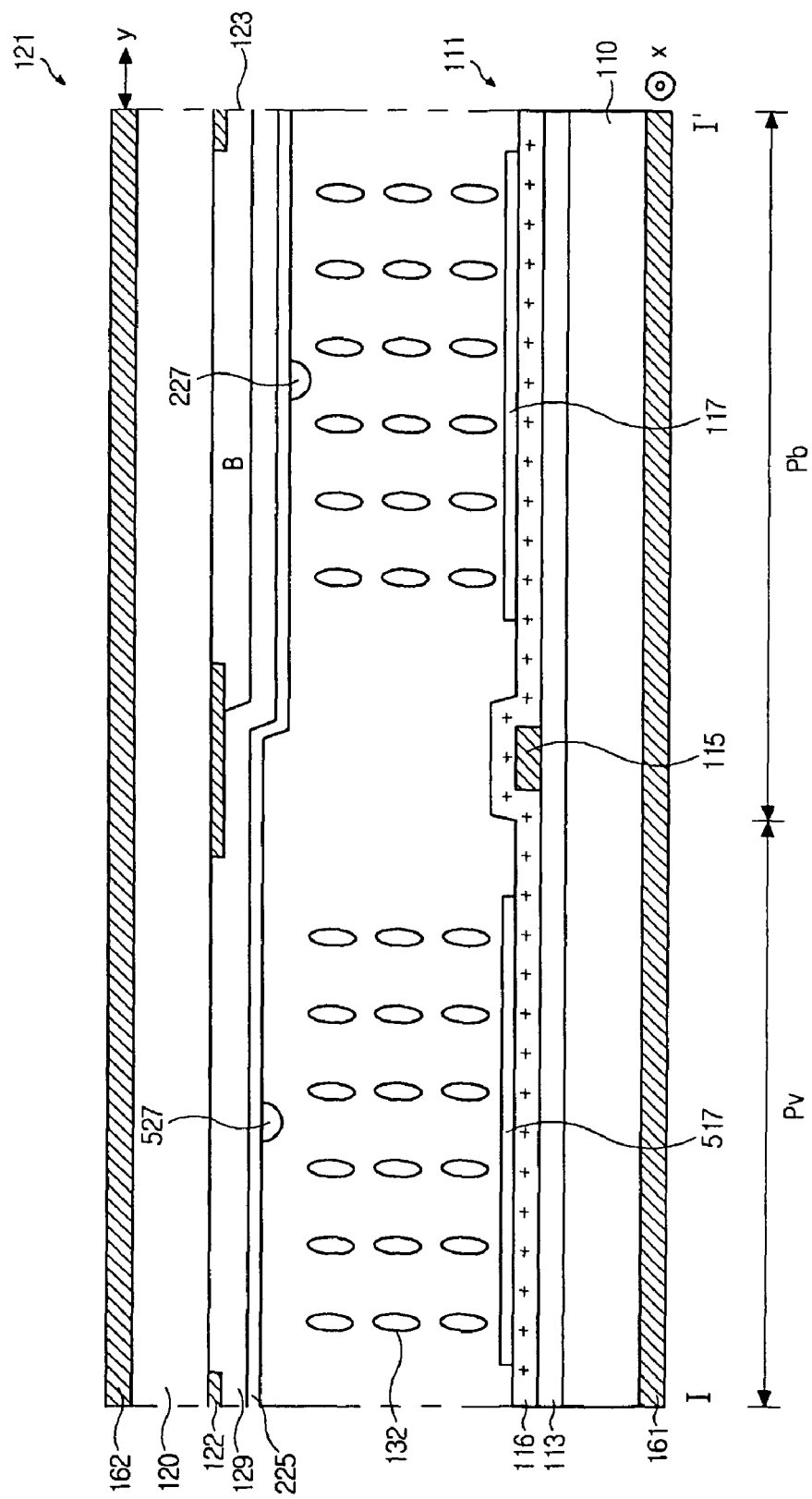
FIG. 6 is a view illustrating operation an LCD device in a no voltage application state.
Figure 7A:
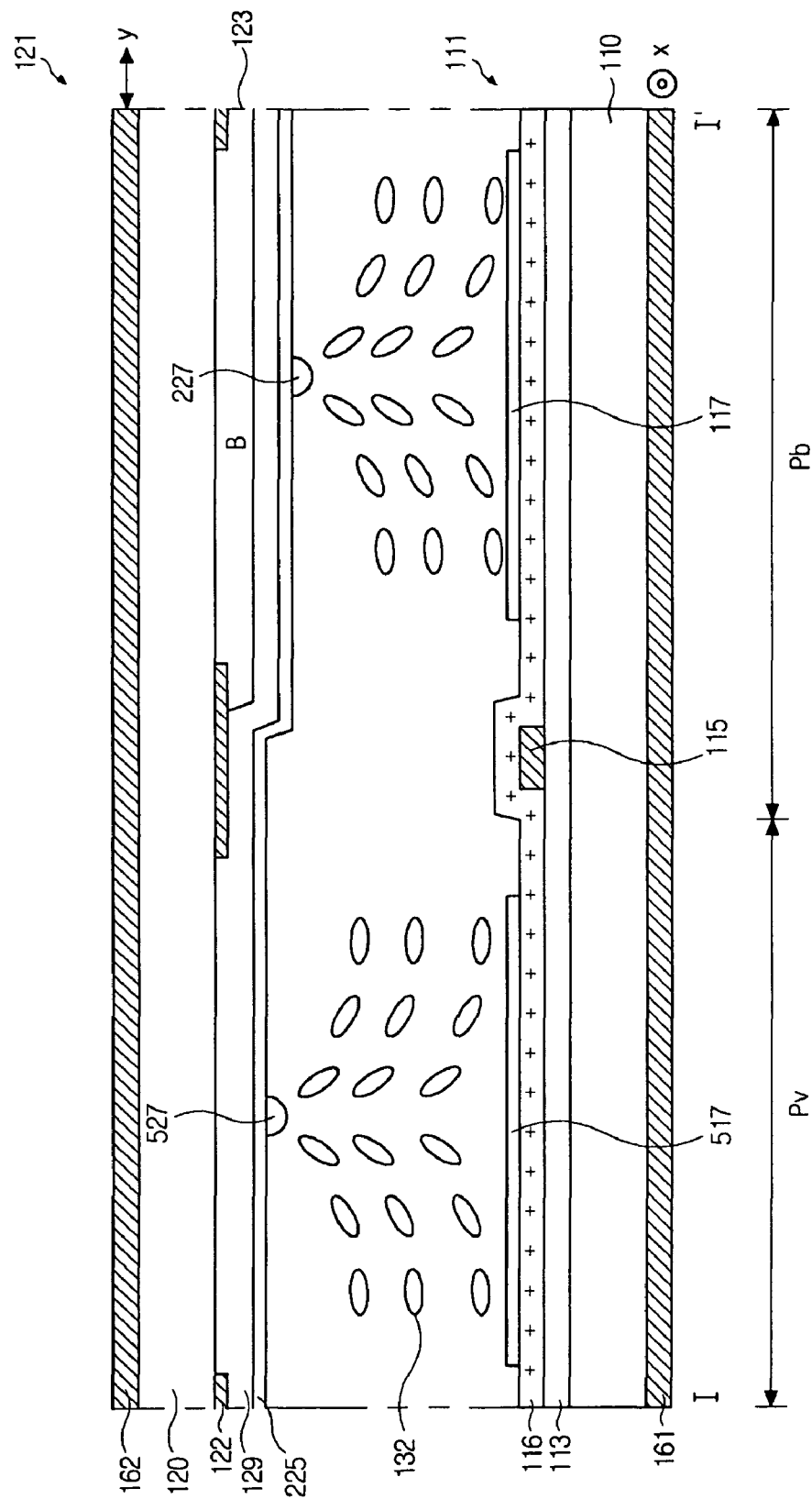
FIGS. 7A and 7B are views illustrating a wide viewing angle mode of an LCD device according to an embodiment of the invention.
Figure 8A:
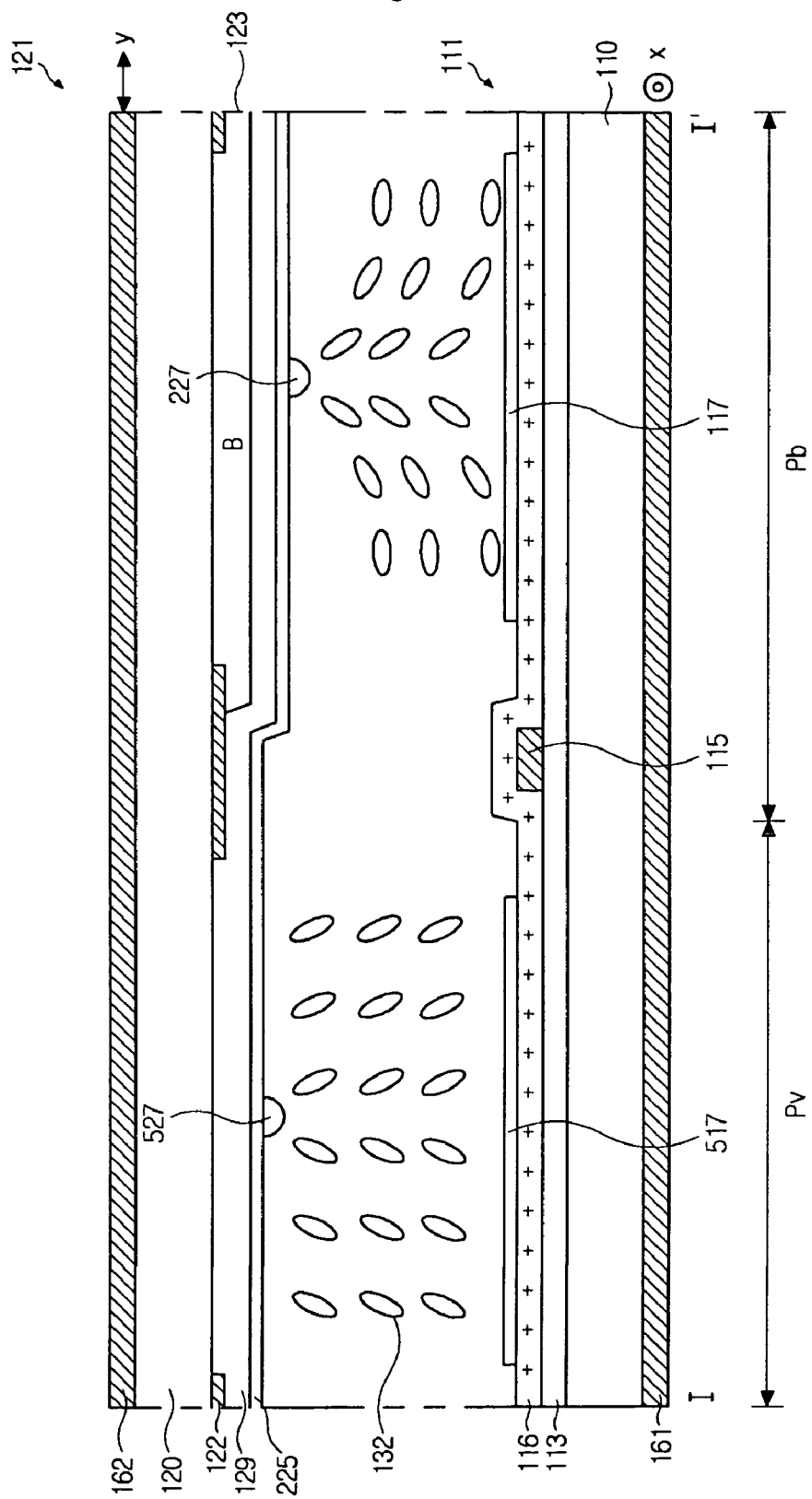

FIGS. 6, 7A, and 8A are views explaining a viewing angle mode according to an embodiment, taken along the line I-I' representing the horizontal direction of a display surface, after a process of attaching the first and second substrates 110 and 120 to each other, an LC forming process, and a process of attaching the first and second polarizers 161 and 162.

FIG. 6 is a view illustrating an LCD device during an off-state when a voltage is not applied to the subpixels Pr, Pg, Pb, and Pv.

Referring to FIG. 6, when a voltage is not applied to the subpixels Pr, Pg, Pb, and Pv, the LCs 132 formed in the subpixels Pr, Pg, Pb, and Pv maintain an initial alignment state. Accordingly, the subpixels Pr, Pg, Pb, and Pv display black.

The LCD device according to the embodiment controls a viewing angle using the viewing angle controlling subpixel Pv when realizing an image through the data displaying subpixels Pr, Pg, and Pb. In addition, the LCD device according to an embodiment improves the brightness of a unit pixel using the viewing angle controlling subpixel Pv.

Figure 7B:
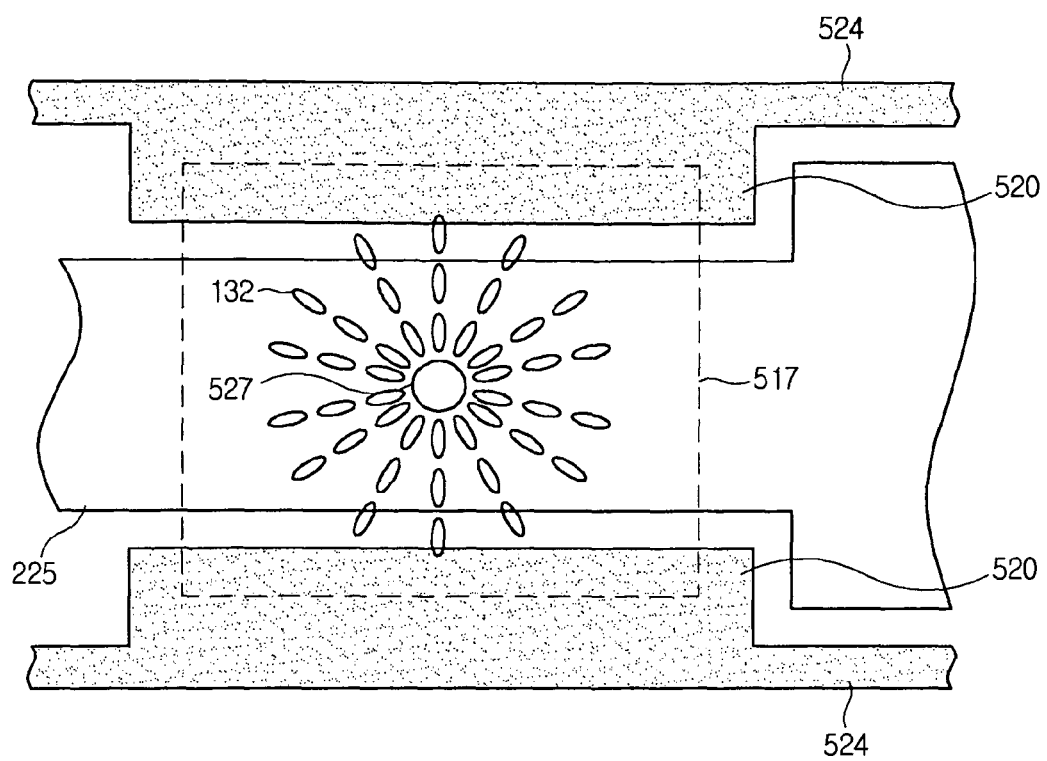

FIGS. 7A and 7B are views illustrating a wide viewing angle mode of an LCD device according to an embodiment of the present invention.

Referring to FIGS. 7A and 7B, an image realized through the data displaying subpixels Pr, Pg, and Pb during the wide viewing angle mode may viewed not only along a front viewing angle direction but also along left and right viewing angle directions. The image viewed at the left and right viewing angle directions is realized by transmitting the image through the viewing angle controlling subpixel Pv in the left and right viewing angle directions.

To realize the image, a common voltage is supplied to the common electrodes 225 of the subpixel Pr, Pg, and Pb. R, G, and B data voltages are applied to the first pixel electrodes 117 of the data displaying subpixels Pr, Pg, and Pb. A vertical electric field is formed between the common electrode 225 to which the common voltage has been applied, and the first pixel electrodes 117 to which the R, G, and B data voltages have been applied. The LCs 132 of the data displaying subpixels Pr, Pg, and Pb are driven to an alignment surface to form a right angle to the electric field, and light transmittance is controlled according to a driving state of the LCs, so that an image is displayed. At this point, since the vertical electric field is distorted by the ribs 227, the LCs 132 are radially distributed to be symmetrical in the vertical and horizontal directions of a display surface around the ribs 227.

During the wide viewing angle mode according to the embodiment, the viewing angle controlling subpixel Pv substantially directly transmits light from the data displaying subpixels Pr, Pg, and Pb in the left and right viewing angle directions, and improves the brightness of an image displayed in the front direction.

To realize the wide viewing angle mode and to improve the brightness of an image, a wide viewing angle data voltage is applied to the second pixel electrode 517 of the viewing angle controlling subpixel Pv, and a voltage having the same potential as that of the common voltage is applied to the side electrode 520. Accordingly, a vertical electric field is generated between the second pixel electrode 517 and the common electrode 225. The LCs 132 contained in the viewing angle controlling subpixel Pv is driven to an alignment layer to form a right angle with the electric field. At this point, since the vertical electric field is distorted by the rib 527, the LCs 132 are radially distributed to be symmetrical in the vertical and horizontal directions of a display surface around the rib 527. For reference, when the long axis of the LC 132 is in parallel to the transmission axes x and y of the first and second polarizers 161 and 162, light incident onto the viewing angle controlling subpixel Pv is not displayed on the display surface. Since light incident in the front viewing angle direction of the viewing angle controlling subpixel Pv passes through the LCs 132 whose long axes are arranged in a radial direction, the light passes through the second polarizer 162 and is displayed on the display surface. Accordingly, the viewing angle controlling subpixel Pv contributes to improving the brightness of an image during the wide viewing angle mode. Additionally, because an image incident from the left and right viewing angle directions of the viewing angle controlling subpixel Pv passes through the LCs 132 arranged nearly horizontal on the display surface without phase delay in response to a wide viewing angle data voltage applied to the second pixel electrode 517, substantially the same image is displayed in the left and right viewing angle direction.

FIGS. 8A and 8B are views illustrating a narrow viewing angle mode of an LCD device according to an embodiment of the present invention.

Referring to FIGS. 8A and 8B, an image realized through the data displaying subpixels Pr, Pg, and Pb is displayed in the front viewing angle direction, and distorted in the left and right viewing angle directions and displayed as different information during the narrow viewing angle mode according to the embodiment. The image displayed in the left and right viewing angle direction is realized by transmitting light through the viewing angle controlling subpixel Pv in the left and right viewing angle direction.

To realize the image, a common voltage is supplied to the common electrodes 225 of the subpixel Pr, Pg, and Pb. R, G, and B data voltages are applied to the first pixel electrodes 117 of the data displaying subpixels Pr, Pg, and Pb. A vertical electric field is formed between the common electrode 225 to which the common voltage has been applied, and the first pixel electrodes 117 to which the R, G, and B data voltages have been applied. The LCs 132 of the data displaying subpixels Pr, Pg, and Pb are driven to an alignment surface to form a right angle to the electric field, and light transmittance is controlled according to a driving state of the LCs, so that an image is displayed. At this point, since the vertical electric field is distorted by the ribs 227, the LCs 132 are radially distributed to be symmetrical in the vertical and horizontal directions of a display surface around the ribs 227.

During the narrow viewing angle mode according to the embodiment, the viewing angle controlling subpixel Pv delays the phase of light from the data displaying subpixels Pr, Pg, and Pb in the left and right viewing angle directions, and improves the brightness of an image displayed in the front direction.

To realize the narrow viewing angle mode and improve the brightness of an image, a narrow viewing angle data voltage is applied to the second pixel electrode 517 of the viewing angle controlling subpixel Pv, and a voltage having a potential difference with respect to the common voltage is applied to the side electrode 520. Accordingly, a vertical electric field formed between the second pixel electrode 517 and the common electrode 225 is distorted by a voltage supplied to the side electrode 520, so that the long axes of the LCs 132 are arranged such that the display surface faces the vertical direction. Simultaneously, since the electric field formed in the viewing angle controlling subpixel Pv is distorted by the rib 527, the LCs 132 are arranged to be symmetric around the rib 527. Light incident in the front viewing angle direction of the viewing angle controlling subpixel Pv passes through the second polarizer 162 through portions where the long axes of the LCs 132 are not parallel to the transmission axes x and y of the first and second polarizers 161 and 162 (that is, the left and right portions of the viewing angle controlling subpixel Pv) and is displayed on the display surface. Accordingly, the viewing angle controlling subpixel Pv contributes to improving the brightness of an image during the narrow viewing angle mode. In addition, since an image incident from the left and right viewing angle directions of the viewing angle controlling subpixel Pv passes through the LCs 132 arranged nearly vertical on the display surface in response to a narrow viewing angle data voltage applied to the second pixel electrode 517, the phase of the image is considerably delayed and distorted information is displayed in the left and right viewing angle directions.

The degree by which the long axes of the LCs 132 are driven in the left and right viewing angle directions is controlled by a viewing angle control data voltage applied to the second pixel electrode 517, so that the wide viewing angle mode and the narrow viewing angle mode can be selectively realized. A light transmittance amount through the viewing angle controlling subpixel Pv in the front direction is also controlled by a voltage applied to the second pixel electrode 517.

As described above, the LCD device according to the embodiment controls the arrangement of the LCs using the viewing angle controlling subpixel to selectively realize the wide viewing angle mode and the narrow viewing angle mode.

Additionally, in the LCD device according to the embodiment, the viewing angle controlling subpixel controls the arrangement of the LCs using the ribs and the side electrode to improve brightness reduction of the pixels.

In addition, because the LCD device according to the embodiment does not require a separate viewing angle controlling panel, manufacturing costs may be reduced. Further, as misalignment in attaching a separate viewing angle controlling panel is not generated, so that manufacturing yield may be increased, and the LCD device can be economically manufactured to have a light weight and a slim profile.

It will be apparent to those skilled in the art that various modifications and variation can be made in the present invention without departing from the spirit or scope of the invention. The described embodiments should be considered as examples. Thus, it is intended that the present invention cover the modifications and variations of this invention provided they come within the scope of the appended claims and their equivalents.

What is claimed is:

1. A liquid crystal display device comprising:
 a pixel for displaying an image including a plurality of subpixels, the subpixels of the pixel including:
 data displaying subpixels each including a corresponding liquid crystal layer of a vertical alignment mode using negative liquid crystals interposed between a corresponding first pixel electrode, the data displaying subpixels for receiving red, green, and blue data voltages to display an image, and a common electrode to which a common voltage is applied;
 a viewing angle controlling subpixel including a corresponding liquid crystal layer of the vertical alignment mode driven in response to voltages applied to the common electrode, a side electrode separated from the common electrode, and a second pixel electrode; and
 a control line electrically connecting to side electrodes of adjacent viewing angle controlling subpixels, the control line avoiding the data displaying subpixels, and each side electrode comprising a pair of side electrode sections facing each other in each viewing angle controlling subpixel with the common electrode interposed between the side electrode sections,
 each of the subpixels of the pixel further including a rib distorting an electric field applied to the corresponding liquid crystal layer, the viewing angle controlling subpixel substantially directly passing light from the data displaying subpixels when an equivalent voltage to the common voltage to the common electrode is applied to the side electrode during a wide viewing angle mode of the liquid crystal display device, and delaying a phase of the light from the data displaying subpixels when a voltage having a voltage difference from the common voltage applied to the common electrode is applied to the side electrode during a narrow viewing angle mode of the liquid crystal display device,
 wherein the side electrode is arranged on the same substrate as the common electrode.

2. The liquid crystal display device according to claim 1, wherein the common electrode is independently formed on a pixel row comprising a row arrangement of subpixels of the pixel.

3. The liquid crystal display device according to claim 1, wherein the common electrode is independently formed on a pixel column comprising a column arrangement of subpixels of the pixel.

4. The liquid crystal display device according to claim 1, wherein the subpixels each include a thin film transistor array and a color filter array facing each other with the corresponding liquid crystal layer interposed therebetween.

5. The liquid crystal display device according to claim 4, wherein the thin film transistor array comprises:
gate lines and data lines defining the subpixels; and
thin film transistors connected to the gate lines and the data lines, wherein the first pixel electrodes are connected to the thin film transistor in the corresponding data displaying subpixels, and the second pixel electrode is connected to the thin film transistor in the viewing angle controlling subpixel.

6. The liquid crystal display device according to claim 4, wherein the color filter array comprises:
a black matrix dividing the subpixels;
red, green, and blue color filter patterns on the data displaying subpixels; and
an overcoat layer covering the color filter patterns and the black matrix.

7. The liquid crystal display device according to claim 6, wherein the common electrode and the side electrode are on the overcoat layer.

8. The liquid crystal display device according to claim 1, wherein the rib of each subpixel is formed in a center of the respective subpixel.

9. The liquid crystal display device according to claim 1, wherein the control line comprises a pair of control lines on one side and the other side of a pixel row comprising a row arrangement of the subpixels.

10. The liquid crystal display device according to claim 1, wherein the side electrode of each adjacent viewing angle controlling subpixels overlaps the second pixel electrode of the respective adjacent viewing angle controlling subpixels.

11. A method for driving a liquid crystal display device, the method comprising:
applying a common voltage to data displaying subpixels and applying a voltage having substantially the same potential as that of the common voltage to a side electrode of a viewing angle controlling subpixel to substantially directly pass light from the data displaying subpixels through the viewing angle controlling subpixel during a wide viewing angle mode; and
applying the common voltage to the data displaying subpixels and applying a voltage having a voltage difference from the common voltage to the side electrode of the viewing angle controlling subpixel to delay, at the viewing angle controlling subpixel, phase of light from the data displaying subpixels during a narrow viewing angle mode,
the data displaying subpixels comprising a liquid crystal layer of a vertical alignment mode using negative liquid crystals between a first electrode to which red, green, and blue data voltages are applied, and a common electrode to which the common voltage is applied, and the viewing angle controlling subpixel comprising the liquid crystal layer of the vertical alignment mode driven in response to a voltage applied to the common electrode, a side electrode separated from the common electrode, and a second pixel electrode,
wherein the side electrode is arranged on the same substrate as the common electrode,
wherein a control line electrically connecting to side electrodes of adjacent viewing angle controlling subpixels comprises a pair of control lines on one side and the other side of a pixel column having a column arrangement of the subpixels.

* * * * *